(12) United States Patent
Kurita et al.

(10) Patent No.: US 6,552,873 B2
(45) Date of Patent: Apr. 22, 2003

(54) RECORDING AND/OR REPRODUCING APPARATUS

(75) Inventors: Kazuhito Kurita, Kanagawa (JP); Yasuhiro Habara, Tokyo (JP); Takahiro Yamada, Saitama (JP)

(73) Assignee: Sony Corporation, Tokyo (JP)

( * ) Notice: Subject to any disclaimer, the term of this patent is extended or adjusted under 35 U.S.C. 154(b) by 138 days.

(21) Appl. No.: 09/855,245

(22) Filed: May 15, 2001

(65) Prior Publication Data

US 2002/0006011 A1 Jan. 17, 2002

(30) Foreign Application Priority Data

May 17, 2000 (JP) ........................................ 2000-145552

(51) Int. Cl.$^7$ ............................................. G11B 17/02
(52) U.S. Cl. ................................... 360/99.06; 369/77.2
(58) Field of Search ............................ 360/99.02, 99.03, 360/99.06, 99.07; 369/75.2, 77.2

(56) References Cited

U.S. PATENT DOCUMENTS

| | | | | |
|---|---|---|---|---|
| 4,953,042 A | * | 8/1990 | Yoshikawa | ................. 360/96.5 |
| 5,880,907 A | * | 3/1999 | Uwabo et al. | ........... 360/99.06 |
| 6,178,149 B1 | * | 1/2001 | Nakamura et al. | ......... 369/77.2 |

* cited by examiner

Primary Examiner—Robert S. Tupper
(74) Attorney, Agent, or Firm—Jay H. Maioli

(57) ABSTRACT

An ejection mechanism for a recording and/or reproducing apparatus by which a recording medium cartridge is to be improved in tractability and reliability in the recording medium cartridge ejecting operation and to lower a production cost. The ejection mechanism includes an insertion/ejection opening for insertion/ejection of a disc cartridge with respect to a main body portion of a recording and/or reproducing apparatus, a lid provided for opening/closing the insertion/ejection opening and a slide operating member for ejecting the disc cartridge from the insertion/ejection opening. The lid is provided with an actuating member for actuating the slide operating member in a lid opening operation relative to the insertion/ejection opening.

6 Claims, 11 Drawing Sheets

RECORDING AND/OR REPRODUCING APPARATUS

BACKGROUND OF THE INVENTION

1. Field of the Invention

This invention relates to an ejection mechanism for discharging a recording medium cartridge, such as disc cartridge. The present invention also relates to a recording and/or reproducing apparatus for recording and/or reproducing the information for a recording medium cartridge, such as a disc cartridge.

2. Description of Related Art

There is known a disc cartridge having housed therein e.g., a magneto-optical disc as a disc-shaped recording medium.

Among portable recording and/or reproducing apparatus for recording and/or reproducing the information on or from this sort of the disc cartridge, there is a so-called slot-in type recording and/or reproducing apparatus in which a disc cartridge is adapted to be thrust into a main body portion of the apparatus.

This slot-in type recording and/or reproducing apparatus includes a main body portion of the apparatus, having an insertion/ejection opening for a disc cartridge, and a lid that enables the insertion/ejection opening to be opened/closed.

The main body portion of the apparatus includes a disc driving mechanism for rotationally driving a magneto-optical disc in the disc cartridge, a recording and/or reproducing mechanism for recording and/or reproducing the information on or from the magneto-optical disc in the disc cartridge and a loading mechanism for causing movement of the disc cartridge between an insertion/ejection position for inserting/ejecting the disc cartridge and a loading position for recording and/or reproducing the information on or from the disc cartridge.

A lid is rotationally supported on the main body portion of the apparatus and is biased by a torsion coil spring in the direction of closing the insertion/ejection opening. So, with the lid, dust and dirt are prevented from being intruded into the main body portion of the apparatus.

The loading mechanism includes a cartridge holder in which to load the disc cartridge, a slide operating member for causing movement of the cartridge holder between the inserting position and the loading position, an ejection member moved by this slide operating member for extruding the disc cartridge loaded on the cartridge holder from inside the cartridge holder, and an operator for causing movement of the slide operating member.

The cartridge holder includes a holder in which to load and hold the disc cartridge. The cartridge holder is provided with plural pivots, on a lateral surface thereof parallel to the insertion/ejection direction of the disc cartridge, for movably supporting the cartridge by the slide operating member.

The slide operating member is mounted for extending along the lateral surface of the cartridge holder, and is provided with plural cam grooves for shifting the catrdge holder between the insertion/ejection position and the loading position. The slide operating member is formed integrally with an operating member for operation in a direction parallel to the direction of movement of the slide operating member.

The ejection member is mounted facing the holding portion for the cartridge holder and is moved in a direction of extruding the disc cartridge held by the cartridge holder as the cartridge holder is moved to the insertion/ejection position as the result of the movement of the slide operating member.

The operator is mounted for movement in unison with the operating portion for the slide operating member and is mounted at a position of facing outside of the main body portion of the apparatus.

In the slot-in type recording and/or reproducing apparatus, described above, the disc cartridge is inserted at the insertion/ejection opening and held by being loaded on the holding portion of the of the cartridge holder. In the recording and/or reproducing apparatus, the cartridge holder, loaded with the disc cartridge by the loading mechanism, is moved from the insertion/ejection position to the loading position. In the recording and/or reproducing apparatus, the magneto-optical disc of the disc cartridge, loaded in position, is rotationally driven by the disc rotating driving mechanism, at the same time as the information is recorded and/or reproduced by the recording and/or reproducing mechanism.

If, in the present recording and/or reproducing apparatus, the disc cartridge loaded in position is to be ejected, the operator is moved as with the finger end to cause movement of the slide operating member via an operating portion. As the slide operating member is moved, the loading mechanism causes movement of the cartridge holder from the loading position to the insertion/ejection position through the pivots engaged in the cam grooves. As the slide operating member is moved, the ejection member is moved to cause the disc cartridge held by the cartridge holder to be extruded and ejected via the insertion/ejection opening. That is, in the recording and/or reproducing apparatus, the slide operating member is moved by movement of the operator to eject the disc cartridge held by the cartridge holder through the insertion/ejection opening.

In the above-described slot-in recording and/or reproducing apparatus, the slide operating member mounted on a lateral surface of the cartridge holder holding the disc cartridge is moved to cause movement of the cartridge holder between the insertion/ejection position and the loading position to effect the operation of loading/unloading of the disc cartridge.

In the slot-in recording and/or reproducing apparatus of a system other than the so-called power loading mechanism, in which the cartridge holder is moved by other than the driving mechanism, an operator moved by the finger end is mounted facing outside the main body portion of the apparatus. It is this operator that produces the movement of the slide operating member.

Meanwhile, in the above-described conventional recording and/or reproducing apparatus, the operator is moved for ejecting the disc cartridge from the main body portion of the apparatus, the slide operating member is moved directly or indirectly. In the latter case, the magnitude of the operating force is changed through another coupling member.

So, with the conventional recording and/or reproducing apparatus, in which the slide operating member is moved by the operator, it is necessary to provide an operator of high toughness to secure mechanical strength, thus raising the production overall cost of the apparatus.

Moreover, in the conventional recording and/or reproducing apparatus, a larger operating force is required to actuate the slide operating member, so that, for securing the larger operating force, the operator tends to be bulky in size.

If the operator is increased in size relative to the main body portion of the apparatus, the portable recording and/or reproducing apparatus cannot be reduced in size or thickness, thus imposing limitations on the degree of freedom in the designing of the apparatus which needs to be reduced in size or thickness. Moreover, in the conventional portable recording and/or reproducing apparatus, the operator, acted on with the finger end, needs to be indented by way of providing finger support, with the result that the operator is further increased in size.

Thus, the conventional recording and/or reproducing apparatus has a drawback that, particularly if the apparatus is of the portable type, the operator protruded appreciably to outside is liable to be subjected to shock in case of inadvertent descent of the entire apparatus with the operator end first, thus leading to destruction.

That is, the conventional portable recording and/or reproducing apparatus of the slot-in type has a deficiency that it is more liable to be destruction descent than in the case of other types, thus lowering the reliability in the ejection of the disc cartridge.

SUMMARY OF THE INVENTION

It is therefore an object of the present invention to provide an ejection mechanism and a recording and/or reproducing apparatus whereby it is possible to improve tractability and reliability in ejecting a recording medium cartridge.

In one aspect, the present invention provides an ejection mechanism including an insertion/ejection opening through which a recording medium cartridge is to be inserted into or ejected from a main body portion, a lid provided for opening/closing the insertion/ejection opening, and means for ejecting the recording medium cartridge through the insertion/ejection opening. The lid is provided with an operating portion which is operated relative to the insertion/ejection opening for opening the insertion/ejection opening for actuating the ejection means.

In the ejection mechanism, an operating portion for the lid acts on the ejection means when the lid is actuated for being opened relative to the insertion/ejection opening to eject the recording medium cartridge from the insertion/ejection opening.

In another aspect, the present invention provides a recording and/or reproducing apparatus including a main body portion having an insertion/ejection opening for inserting/ejecting the recording medium cartridge, a lid provided on the main body portion for opening/closing the insertion/ejection opening, and means for ejecting the recording medium cartridge through the insertion/ejection opening. The lid is provided with an operating portion which is operated relative to the insertion/ejection opening for opening the insertion/ejection opening for actuating the ejection means.

In the recording and/or reproducing apparatus, the ejection means is acted on by the operating portion of the lid, as the lid is acted on relative to the insertion/ejection opening, to eject the recording medium cartridge from the insertion/ejection opening of the main body portion of the apparatus.

DESCRIPTION OF THE PREFERRED EMBODIMENTS

Figure 1:
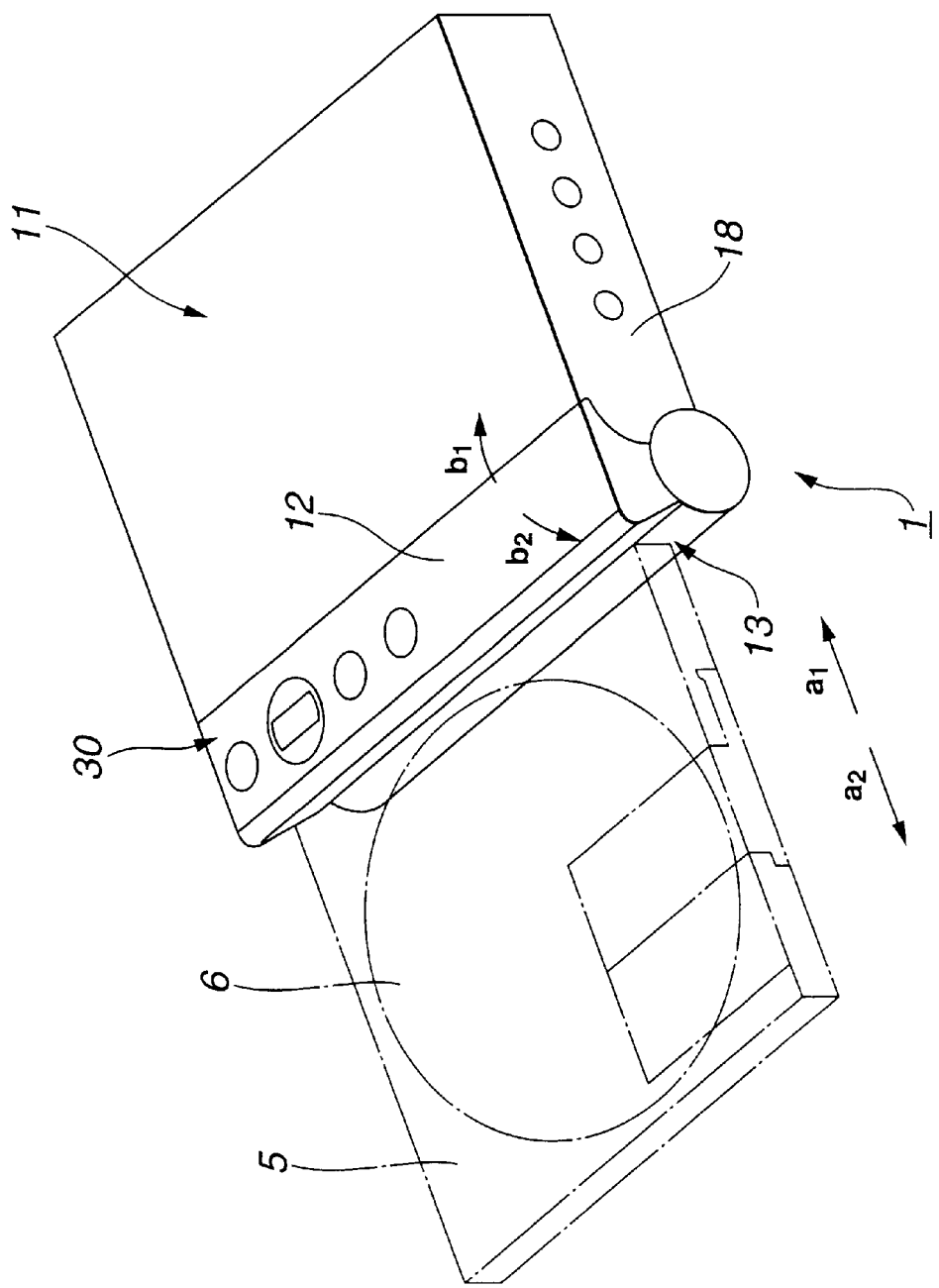
FIG. 1 is a perspective view showing a disc player according to the present invention.

Referring to the drawings, preferred embodiments of a portable disc player according to the present invention will be explained in detail. For example, a disc cartridge 5, having housed therein a magneto-optical disc 6, can be loaded/unloaded on or from a disc player 1, as shown in FIG. 1.

The disc player 1 includes a main body portion 11 having an insertion/ejection opening 13 via which a disc cartridge 5 is inserted/ejected into or from the disc cartridge 5 in the direction indicated by arrows a1 and a2 and a lid 12 for opening/closing the insertion/ejection opening 13, as shown in FIG. 1.

The main body portion 11 includes a substantially rectangular insertion/ejection opening 13 leading to the interior of the apparatus, as shown in FIG. 1. The main body portion 11 includes a disc driving mechanism 15 for rotationally driving a magneto-optical disc 6 in the disc cartridge 5, a reproducing mechanism 16 for reproducing the information of a magneto-optical disc 6 in the disc cartridge 5, a loading mechanism 17 for causing movement of the disc cartridge 5 between a position of insertion/ejection placing the disc cartridge 5 in front of the insertion/ejection opening 13 and a loading position of reproducing the information from the disc cartridge 5, and an outer casing 18 for covering these mechanisms 15 to 17, as shown in FIGS. 1 and 2.

The lid 12 is sized to be large enough to close the insertion/ejection opening 13, as shown in FIG. 1. The lid 12 is supported by rotary shafts 21, 21, provided inwardly of the outer casing 18, for rotation in the direction indicated by arrows b1 and b2 in FIG. 2. The lid 12 is formed integrally with a set of supporting pieces 22, 23 positioned on both sides in the width-wise direction of the disc cartridge 5 inserted into or ejected from the insertion/ejection opening 13, so that the supporting pieces 22, 23 are supported for rotation relative to the outer casing 18.

These supporting pieces 22, 23 are formed on a lateral side facing the loading mechanism 17 as one with a protuberant operating portion 25 operated for opening relative to the insertion/ejection opening 13 for actuating the loading mechanisin 17 for ejecting the disc cartridge 5. The operating portion 25 is formed at a position spaced a pre-set distance from the rotary supporting shaft 21 as the center of rotation of the lid 12. The magnitude of the operating force produced on rotation of the lid 12 may readily be adjusted depending on the distance from the center of rotation.

Figure 2:
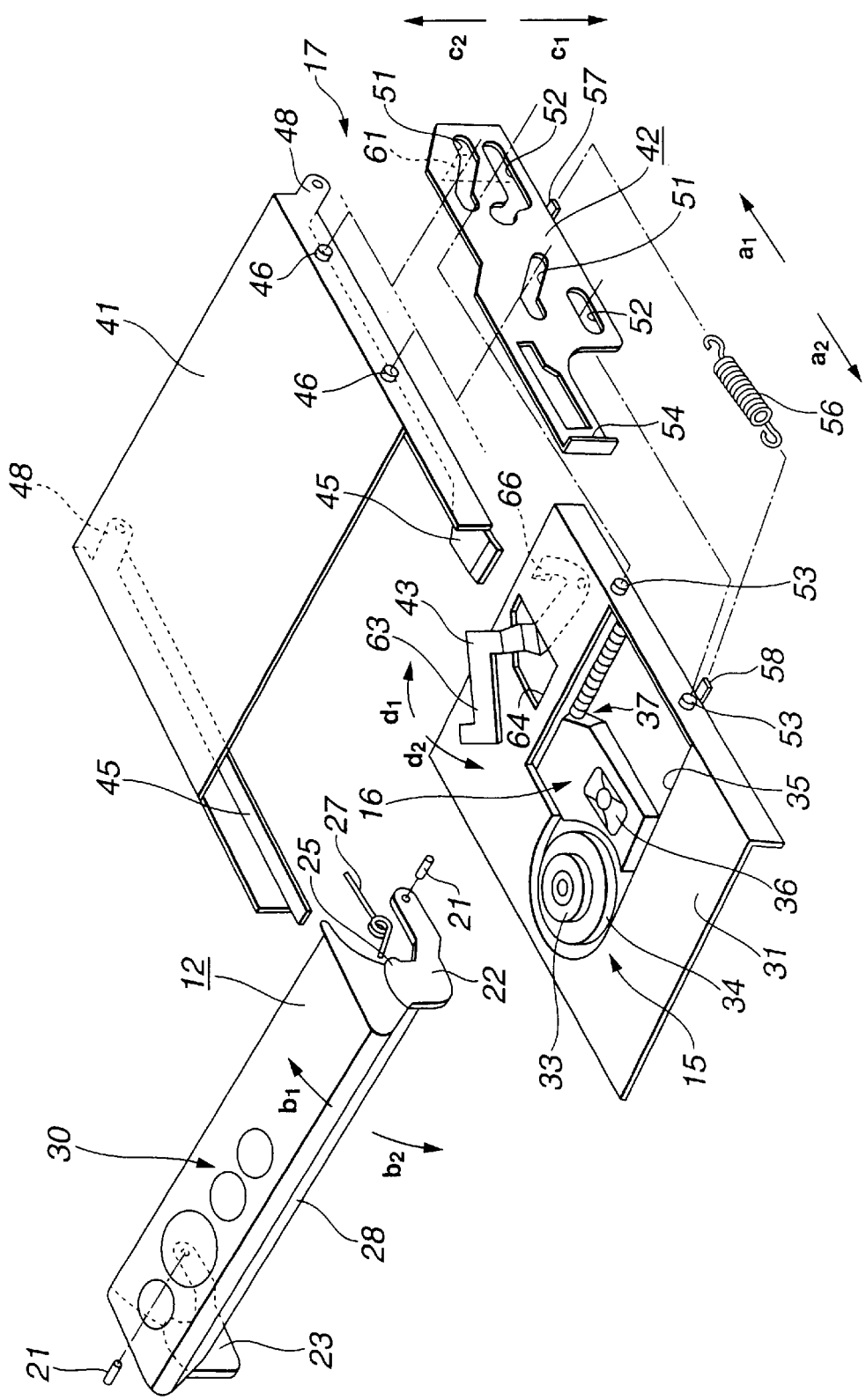
FIG. 2 is an exploded perspective view showing essential parts of the disc player shown in FIG. 1.

The lid 12 is biased by the force of a torsion coil spring 27 provided on one of the supporting pieces 22 for rotation in the direction indicated by arrow b2 in FIG. 2 for closing the insertion/ejection opening 13, as shown in FIG. 2. This lid 12 operates for preventing intrusion of dust and dirt through the insertion/ejection opening 13 into the inside of the apparatus.

Figure 3:
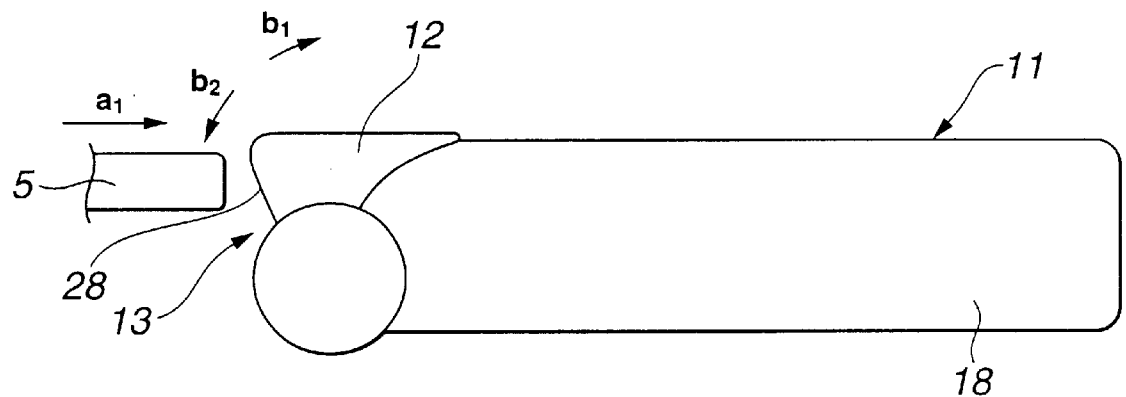
FIG. 3 is a side view showing the state of insertion of the disc cartridge into an insertion/ejection opening.
Figure 4:
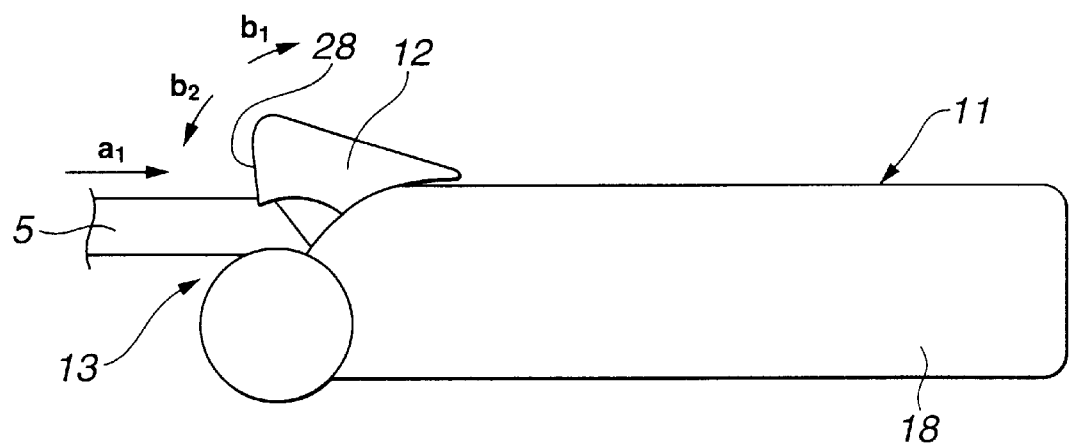
FIG. 4 is a side view showing the state in which the disc cartridge is being intruded into the insertion/ejection opening.

On a surface of the lid 12 facing outwards, there is formed an abutment surface 28 on which an intruding end of the disc cartridge 5 compresses when the disc cartridge 5 is intruded into the insertion/ejection opening 13. This abutment surface 28 is inclined at a pre-set angle relative to the direction perpendicular to the insertion/ejection of the disc cartridge 5, as shown in FIGS. 2 and 3. The abutment surface 28 is abutted by the intruding end of the disc cartridge 5 so as to be rotated in the direction indicated by arrow b1 with the intruding operation of the disc cartridge 5.

On the major surface of the lid 12, there is formed an operating portion 30 having plural operating buttons for actuating the disc driving mechanism 15 and the reproducing mechanism 16, as shown in FIG. 1.

The main body portion 11 includes a chassis 31 for supporting the disc driving mechanism 15 and the reproducing mechanism 16, positioned on the bottom side along its thickness, as shown in FIG. 2.

The disc driving mechanism 115 is provided at a mid portion of the chassis 31, as shown in FIG. 2, and includes a disc table 33 on which rests the inagneto-optical disc 6 in the disc cartridge 5, and a spindle motor 34 for rotationally driving the disc table 33, as shown in FIG. 2.

The reproducing mechanism 16 is mounted for movement in a feed opening 35 formed in the chassis 31, and includes an optical pickup 36 for reproducing the information from the magneto-optical disc 6 and a feed mechanism 37 for rotationally driving the optical pickup 36 along the radius of the magneto-optical disc 6, as shown in FIG. 2.

The loading mechanism 17 includes a cartridge holder 41 for holding the disc cartridge 5, a slide operating member 42 for moving the cartridge holder 41 between the position of insertion/ejection and the loading position, and an ejection member 43 moved by the slide operating member 42 for extruding the disc cartridge 5 loaded on the cartridge holder 41 from within the cartridge holder 41, as shown in FIG. 2

The cartridge holder 41 includes holding pieces 45, 45 for holding the loaded disc cartridge 5. A plurality of pivots 46,46, movably supported by the slide operating member 42, are provided on lateral sides of the cartridge holder 41 extending parallel to the direction of insertion/ejection of the disc cartridge 5.

A set of connecting pieces 48, 48, rotatably coupled to the chassis 31 via connecting members, not shown, are formed integrally with the lateral sides of the cartridge holder 41 parallel to the direction of insertion/ejection of the disc cartridge 5, as shown in FIG. 2.

The slide operating member 42 is mounted for extending along the lateral side of the cartridge holder 41, and includes cam grooves 51, 51 engaged by the pivots 46, 46 of the cartridge holder 41 for causing movement of the cartridge holder 41 between the position of insertion/ejection and the loading position, as shown in FIG. 2.

The slide operating member 42 includes guide grooves 52, 52 supported for movement in the direction indicated by arrows a1 and a2 with respect to the chassis 31, as shown in FIG. 2. The chassis 31 also includes guide shafts 53, 53 engaged in the guide grooves 52, 52 of the slide operating member 42 for movement along the guide grooves 52, 52 of the slide operating member 42.

The slide operating member 42 is formed integrally with an operating portion 54 abutted by the operating portion 25 of the lid 12 so as to be moved parallel to the direction of movement of the slide operating member 42.

The slide operating member 42 is formed integrally with a retainer 57 engaged by an end of a torsion coil spring 56 biased in the direction indicated by arrow a2, as shown in FIG. 2. The chassis 31 is also formed integrally with another retainer 58 engaged by the other end of the torsion coil spring 56. Therefore, the torsion coil spring 56 has its both ends engaged by the retainer 58 of the chassis 31 and by the retainer 57 of the slide operating member 42 for biasing the slide operating member 42 relative to the chassis 31 in the direction indicated by arrow a2. The cartridge holder 41 is biased into movement towards the loading position in the direction indicated by arrow c1 by the slide operating member 42 being biased in the direction indicated by arrow a2.

The slide operating member 42 is formed integrally with an engaging piece 61, engaged by the ejection member 43, in adjacency to the chassis 31, as shown in FIG. 2.

The ejection member 43 is mounted at its mid portion by a pivot, not shown, for rotation in the direction indicated by arrow d1, as shown in FIG. 2. The ejection member 43 is formed integrally with an ejection piece 63 at its one end for ejecting the disc cartridge 5 held by the cartridge holder 41 in the direction indicated by arrow a2. This ejection piece 63 is inserted in an opening 64 provided in the chassis 91 for rotation in the direction indicated by arrows d1 and d2. The ejection member 43 is also biased for rotation in the direction indicated by arrow d2 under the force of a torsion coil spring, not shown.

The ejection member 43 is also formed integrally with an engagement pawl 66 at its other end for engagement by the engaging piece 61 of the slide operating member 42, as shown in FIG. 2. The slide operating member 42 is held in a state moved in the direction indicated by arrow a1 by the engagement pawl 66 engaged by the engaging piece 61 of the slide operating member 42. The ejection member 43 is moved in the direction indicated by arrow d1 against the bias of the torsion coil spring whereby the engaged state of the engagement pawl 66 with the engaging piece 61 is resolved to permit the slide operating member 42 to be moved in the direction indicated by arrow a2 under the bias of the torsion coil spring 56.

In the above-described disc player 1, the operation of the disc cartridge 5 being inserted into and ejected from the insertion/ejection opening 13 is now explained with reference to the drawings.

First, referring to FIG. 3, the lid 12 has been rotated under the biasing force of the torsion coil spring 27 in the direction indicated by arrow b2, as shown in FIG. 3, so that the insertion/ejection opening 13 is closed by the lid 12.

The disc cartridge 5 then is moved in the direction of insertion into the insertion/ejection opening 13, in the direction indicated by arrow a1 in FIG. 3, so that the intruding end of the disc cartridge 5 compresses against the abutment surface 28 of the lid 12. As the disc cartridge 5 is moved in the direction indicated by arrow a1, the lid 12 is moved against the bias of the torsion coil spring 27 in the direction indicated by arrow a1 to open the insertion/ejection opening 13 with movement of the disc cartridge 5.

In the disc player 1, the disc cartridge 5 is intruded in the direction indicated by arrow a1 into the insertion/ejection opening 13, opened by the lid 12 being rotated in the direction indicated by arrow b1, whereby the disc cartridge 5 is loaded in position in the cartridge holder 41.

Figure 5:
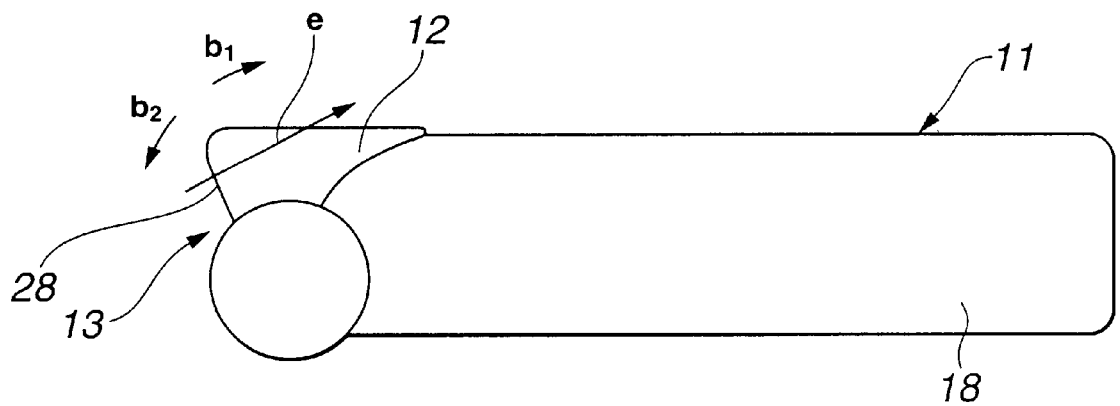
FIG. 5 is a side view showing the state in which the disc cartridge has been intruded into the insertion/ejection opening.

After the disc cartridge 5 has been loaded in position in the cartridge holder 41, the lid 12 is rotated under the bias of the torsion coil spring 27 in the direction indicated by arrow b2 to close the insertion/ejection opening 13, as shown in FIG. 5.

When ejecting the disc cartridge 5 loaded in the main body portion 11 of the disc player 1, a finger end, for example, is put on e.g., the abutment surface 28 of the lid 12 to rotate the lid 12 in the direction indicated by arrow b1 against the bias of the torsion coil spring 27, as shown in FIG. 5.

Figure 6:
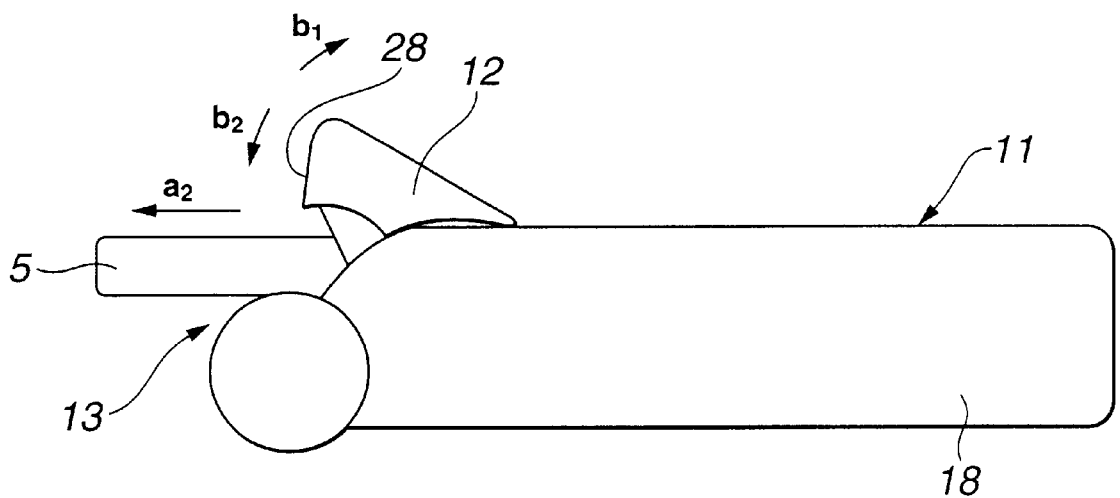
FIG. 6 is a side view showing the state of ejection of the disc cartridge from the insertion/ejection opening.

As the lid 12 is rotated in the direction indicated by arrow b2 in FIG. 6, the operating portion 25 causes movement of the slide operating member 42 to cause rotation of the ejection member 43 to eject the disc cartridge 5 from the insertion/ejection opening 13.

In the above-described disc player 1, the operation of causing movement of the slide operating member 42 by the operating portion 25 of the lid 12 in inserting/ejecting the disc cartridge 5 into or from the insertion/ejection opening 13 is explained with reference to the drawings.

Figure 7:
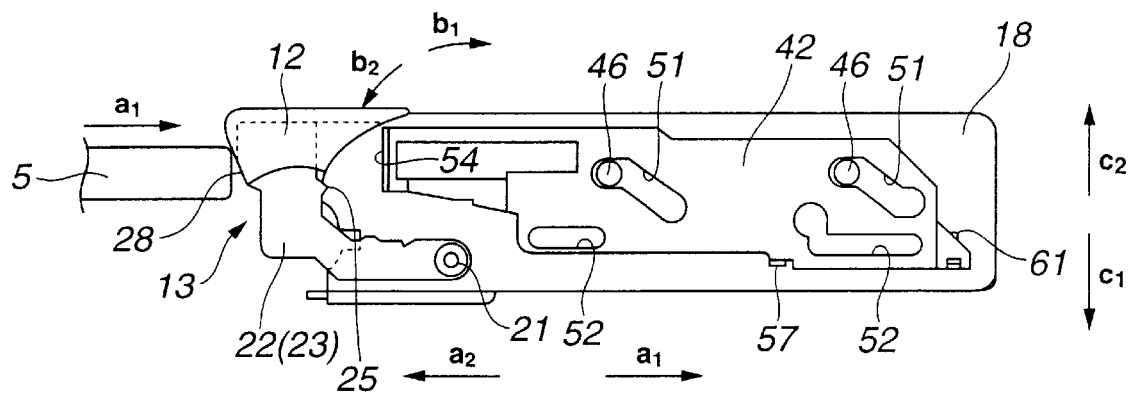
FIG. 7 is a side view showing the state in which the inserting end of the disc cartridge has compressed against an abutment surface of a lid.

When the disc cartridge 5 has not as yet been loaded in the main body portion 11 of the disc player 1, the insertion/ejection opening 13 is closed by the lid 12, with the slide operating member 42 having been moved in the direction indicated by arrow a1, as shown in FIG. 7. Since the slide operating member 42 has been moved in the direction indicated by arrow a1, the cartridge holder 41 in the disc player 1 is moved in the direction indicated by arrow c2 and located in the insertion/ejection position with respect to the insertion/ejection opening 13. By the engaging piece 61 engaging with the engagement pawl 66 of the ejection member 43, the slide operating member 42 is kept in its state of having been moved in the direction indicated by arrow a1 against the bias of the torsion coil spring 56.

Figure 8:
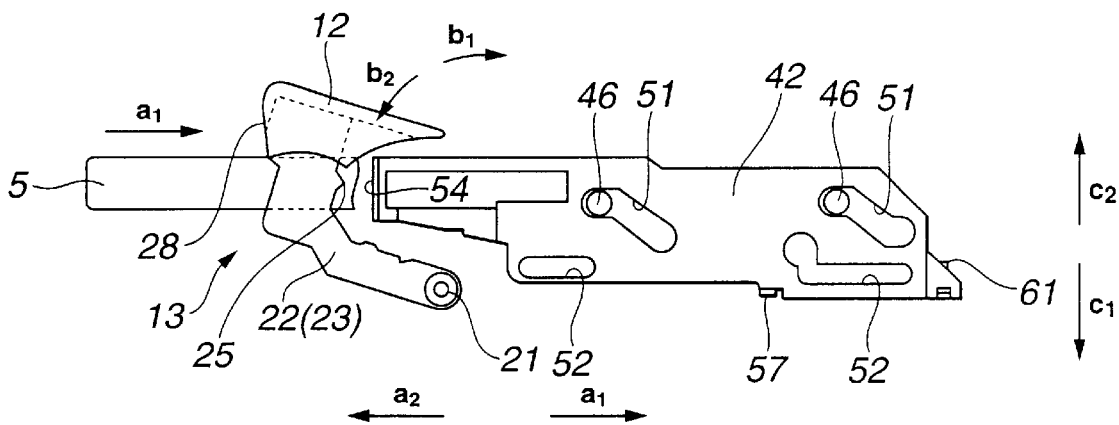
FIG. 8 is a side view showing the state in which the lid has been rotated.

By the disc cartridge 5 being intruded into the insertion/ejection opening 13, in the disc player 1, the intruding end of the disc cartridge 5 compresses against the abutment surface 28 of the lid 12 to cause the lid 12 to be rotated in the direction indicated by arrow b1 with the intruding operation of the disc cartridge 5 to open the insertion/ejection opening 13, as shown in FIGS. 7 and 8.

When the disc cartridge 5 is intruded into the insertion/ejection opening 13, the lid 12, rotated in the direction indicated by arrow b1, is rotated without the operating portion 25 abutting against the operating portion 54 of the slide operating member 42, because the slide operating member 42 has been rotated in the direction indicated by arrow a1 at the time of insertion of the disc cartridge 5 into the insertion/ejection opening 13, as shown in FIG. 8.

The disc cartridge 5, inserted through the insertion/ejection opening 13, is loaded in the cartridge holder 41, while causing rotation of the ejection member 43 in the direction indicated by arrow d1. On rotation in this manner in the direction indicated by arrow d1 of the ejection member 43, the engaged state of the engaging piece 61 of the slide operating member 42 with the engagement pawl 66 is resolved to permit movement of the slide operating member 42 in the direction indicated by arrow a2 under the bias of the torsion coil spring 56.

Figure 9:
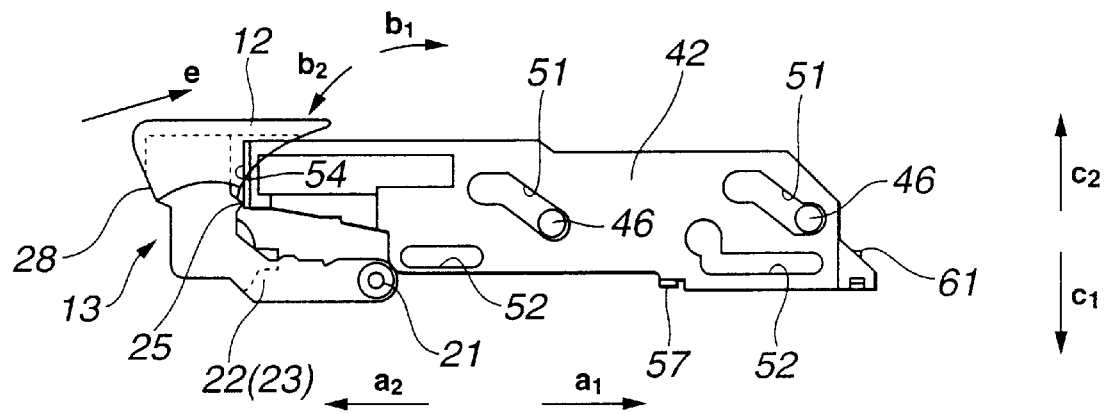
FIG. 9 is a side view showing the state of compression of an operating portion of the lid and an actuating portion of a slide operating member.

By the slide operating member 42 being moved in the direction indicated by arrow a2 in FIG. 9, the cartridge holder 41, having the pivots 46, 46 engaged in the cam grooves 51, 51, is moved in the direction indicated by arrow c2 to move the disc cartridge 5 held by the cartridge holder 41 to the loading position, at the same time as the operating portion 54 abuts on the operating portion 25 of the lid 12. Moreover, the slide operating member 42, moved in the direction indicated by arrow a2, is engaged by the lateral side of the ejection member 43, rotated in the direction indicated by arrow d1, to keep the state of rotation of the ejection member 43 in the direction indicated by arrow d1.

Figure 10:
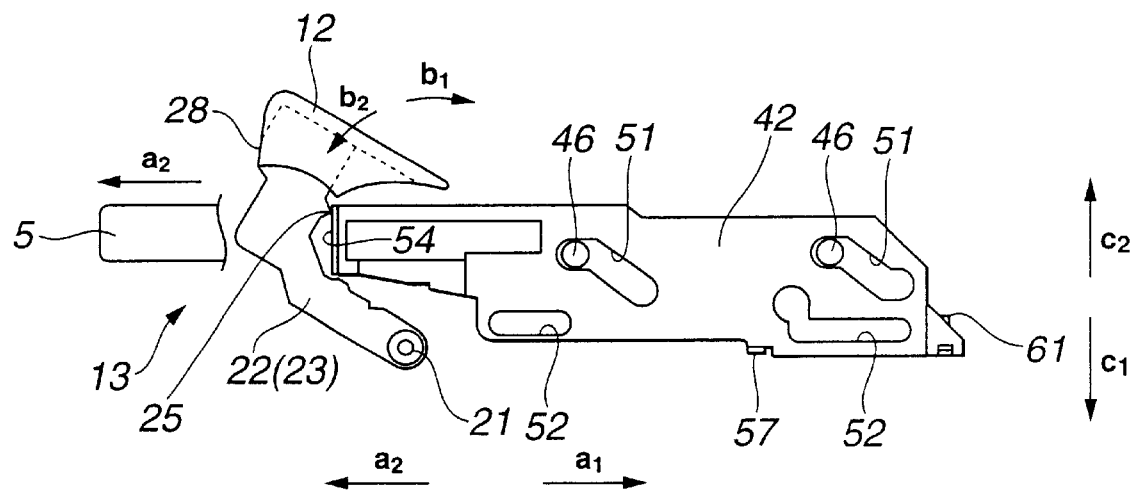
FIG. 10 is a side view showing the state of movement of the actuating portion of the slide operating member by the operating portion of the lid.

In ejecting the disc cartridge 5, loaded in position, the lid for closing the insertion/ejection opening 13 is rotated, such as with a finger end, in the direction indicated by arrow b1, against the bias of the torsion coil spring 27, as shown in FIG. 10.

As the lid 12 is rotated further in the direction indicated by arrow b1, the slide operating member 42 causes the slide operating member 42, compressing against the operating portion 54, in the direction indicated by arrow a1, against the force of the torsion coil spring 56. As the slide operating member 42 is moved in the direction indicated by arrow a1, the cartridge holder 41, the pivots 46, 46 of which are engaged in the cain grooves 51, 51, is moved in the direction indicated by arrow c2 to cause movement of the cartridge holder 41 to its position of insertion/ejection. As the slide operating member 42 is moved in the direction indicated by arrow a1, the ejection member 43 is rotated in the direction indicated by arrow d2, under the bias of the torsion coil spring, to eject the disc cartridge 5, held by the cartridge holder 41, in the direction indicated by arrow a2 through the insertion/ejection opening 13.

Figure 11:
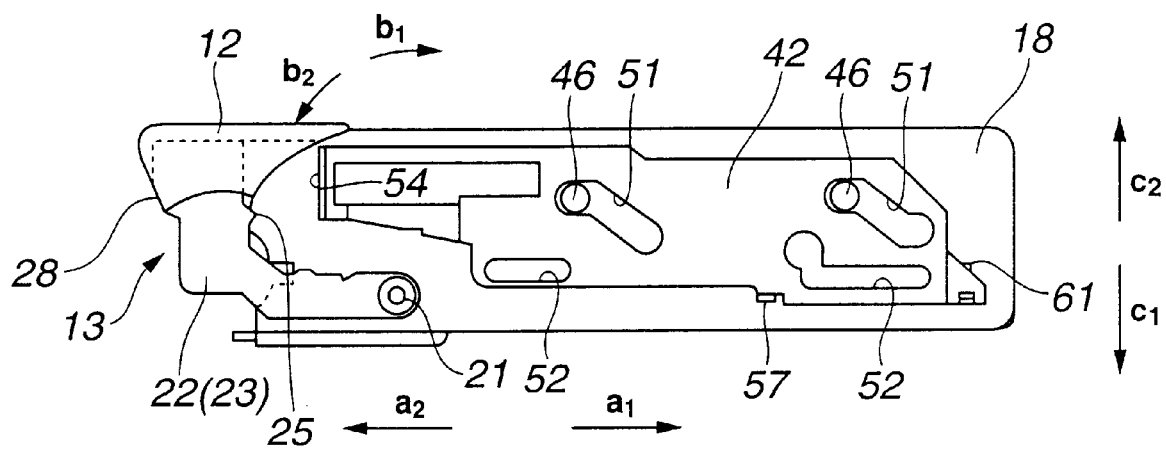
FIG. 11 is a side view showing the state in which the disc cartridge has been ejected from the disc player.

That is, the insertion/ejection opening 13 is opened when the disc cartridge 5 is loaded in position, so that the operating portion 25 of the lid 12 compresses against the operating portion 54 of the slide operating member 42 to eject the disc cartridge 5 held on the cartridge holder 41 from the insertion/ejection opening 13. After ejection of the disc cartridge 5, the lid 12 is rotated in the direction indicated by arrow b2 under the bias of the torsion coil spring 27 to close the insertion/ejection opening 13, as shown in FIG. 11.

Figure 12:
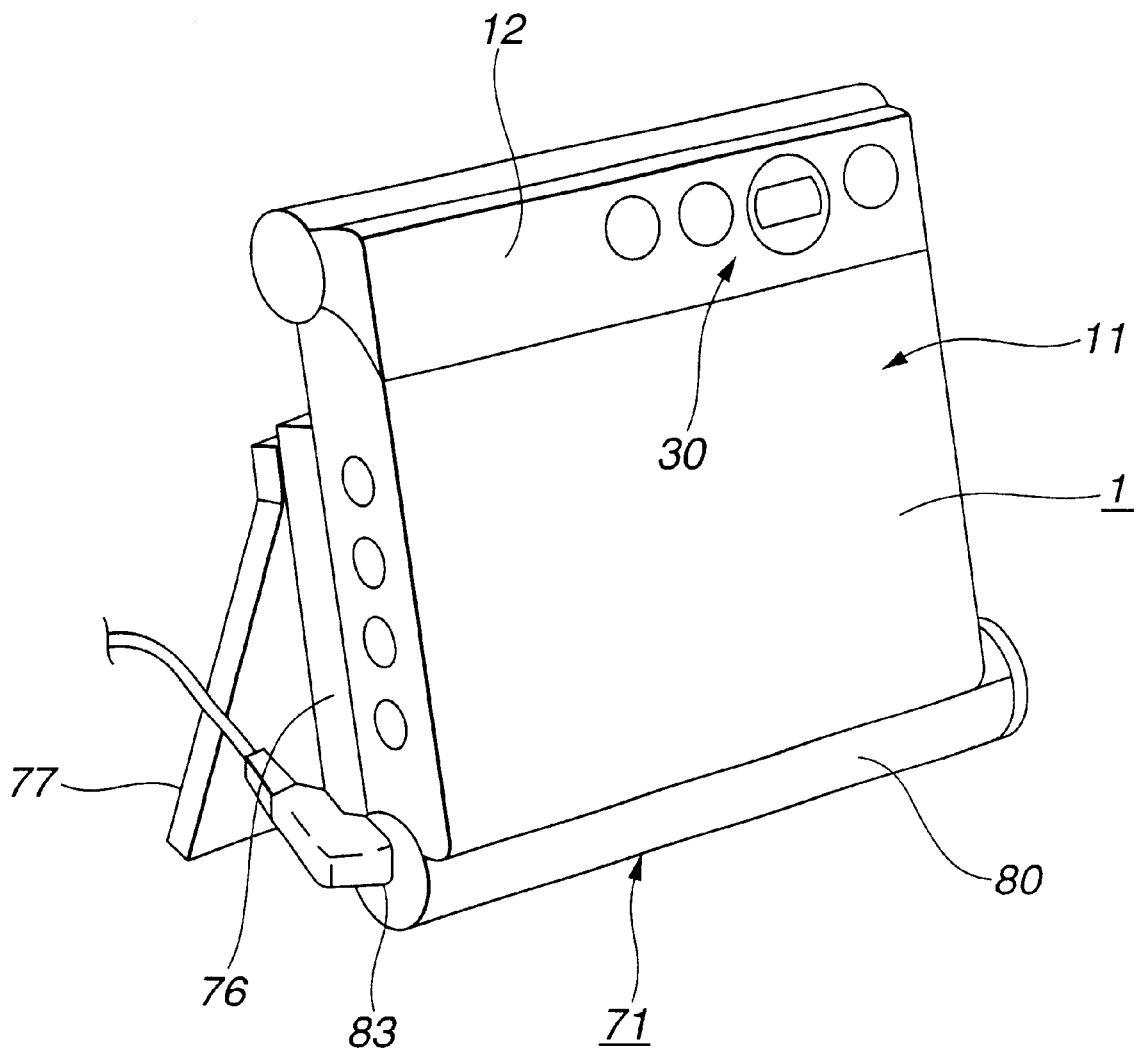
FIG. 12 is a perspective view showing the state in which the disc player has been set on a supporting base for electrical charging.
Figure 13:
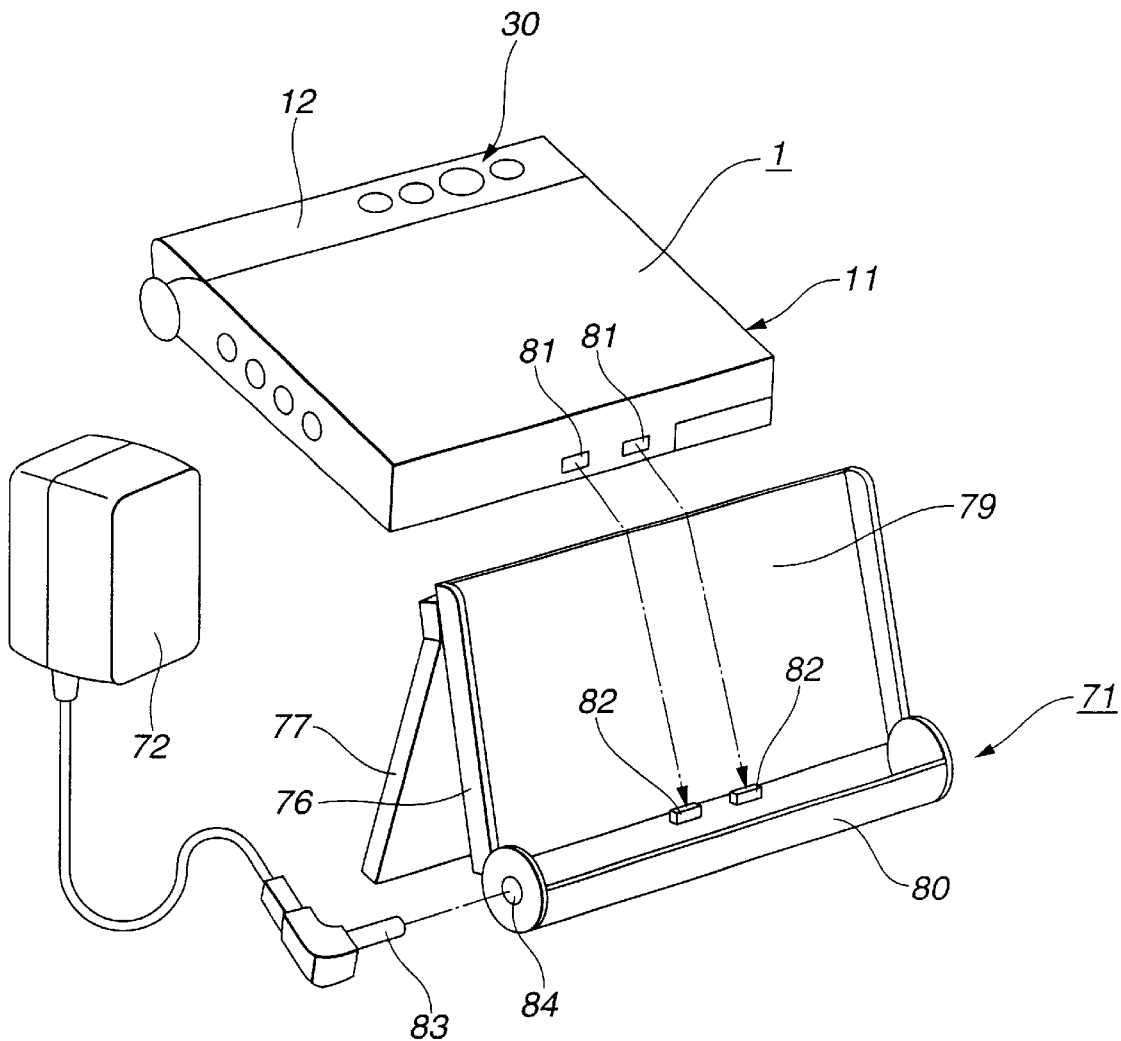
FIG. 13 is an exploded perspective view for illustrating the state in which the disc player has been set on the supporting base for electrical charging.

As the disc player 1 is put on a charging table 71, fed with the driving power for charging, the driving power is fed to a battery in the main body portion 11 of the disc player 1, as shown for example in FIGS. 12 and 13. The charging table 71 includes a base 76 on which to put the disc player 1 and a support 77 that may be warped relative t the base 76, as shown in FIG. 12.

The base 76 includes a setting surface 79, on which the bottom of the main body portion 11 is set, and a setting portion 80 on which rests the back surface of the main body portion 11, as shown in FIG. 13. A power supply terminal a1 82 for electrically connecting the base to a connection terminal portion 81 provided on the back surface of the main body portion 11, as shown in FIG. 13. The base 76 is also provided with a connection terminal 84 for electrically connecting the base to a supply terminal 83 of a feeder line for a power source adapter 72 electrically connected to an external power source, not shown.

The support 77 is substantially flat-plate-shaped and warpably supported by the base 76 by a hinge part, not shown. The support 77 is warped by being folded on itself relative to the base 76, as shown in FIGS. 12 and 13, so that the disc player 1 can be set in a so-called longitudinal setting during charging. The support 77 has its major surface bent so as to be parallel to the setting surface of the base 76, in a manner not shown, so that the disc player 1 can be set in the so-called longitudinal setting during charging. So, the present charging table 71 can be suitable deformed in charging to conform to the state of the setting place, such as room or car.

With the disc player 1, described above, the slide operating member 42 may be moved with the rotating movement of the lid 12 by the operating portion 25 of the lid 12 to eject the disc cartridge 5 from the insertion/ejection opening 13 extremely readily.

With the present disc player 1, as described above, in which the slide operating member 42 is moved by rotation of the lid 12, so that it is possible to reduce the operating force required for actuating the slide operating in member 412 depending on the position of the operating portion 25 relative to the center of rotation of the lid 12.

Moreover, with the disc player 1, the operator for actuating the slide operating member may be dispensed with, thus simplifying the structure. In addition, the ejecting movement may be improved in reliability to lower the production cost.

Since the operator protruded outwardly from the main body portion 11 is dispensed with, it is possible to prevent destruction such as in case of descent.

Although the disc player 1 of the present invention is constructed as a portable device, it may also be applied to other types of the recording and/or reproducing apparatus, such as a car-laden disc player.

The above-described disc player 1 is a so-called slot-in type disc player in which the disc cartridge 5 is inserted into the insertion/ejection opening 13 of the main body portion 11. Alternatively, the present invention may also e applied to a so-called popup type disc player in which the cartridge holder holding the disc cartridge 5 may be moved towards and away from the main body portion. This type of the disc player, as a disc player 2, is now briefly explained by referring to the drawings.

Figure 14:
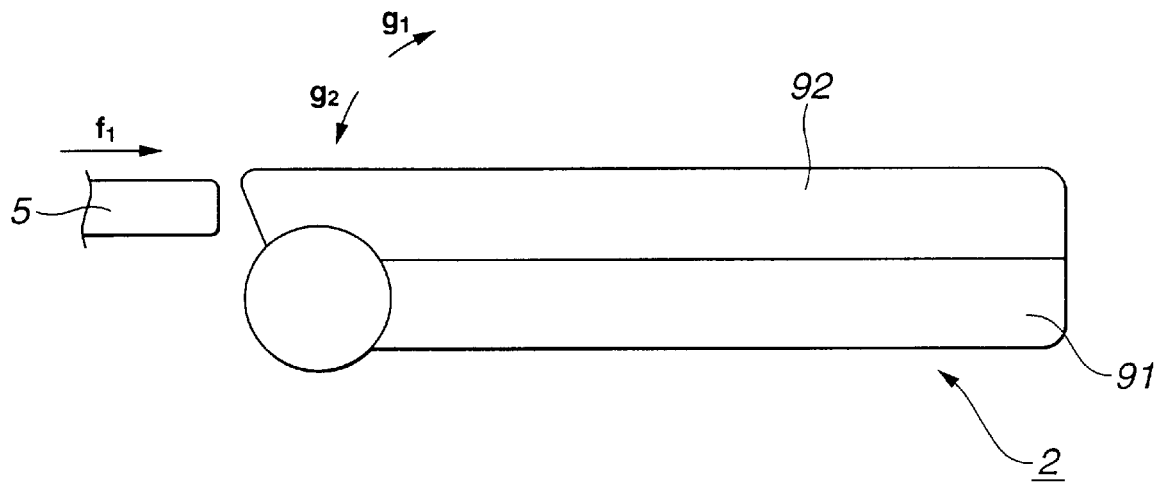
FIG. 14 is a side view showing the state of insertion of a disc cartridge into another disc player.
Figure 15:
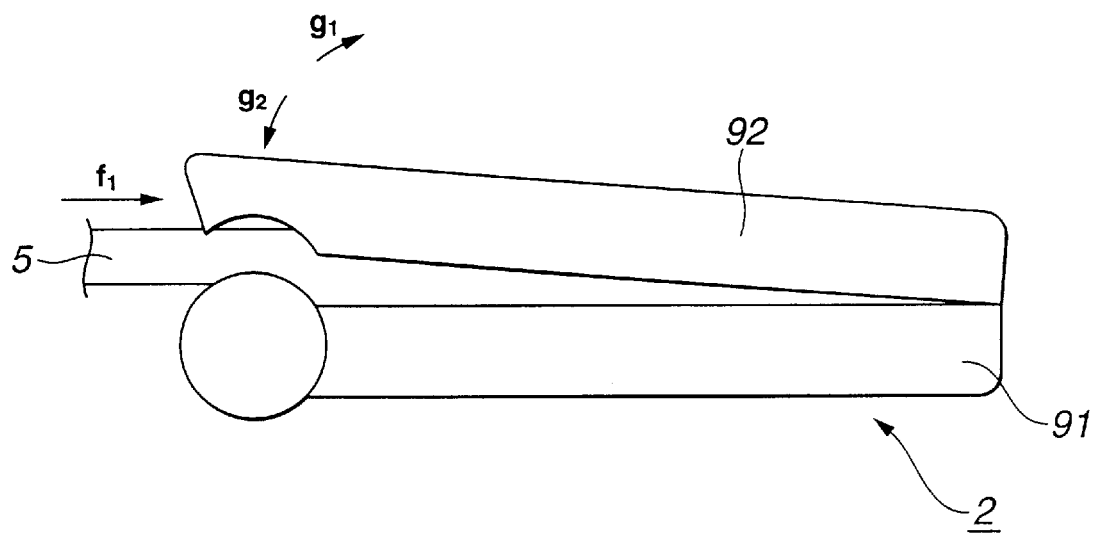
FIG. 15 is a side view showing the state in which the disc cartridge is being inserted into the disc player of FIG. 14.

Referring to FIGS. 14 and 15, the disc player 2 includes a main body portion 91, having a cartridge holder, not shown, and a lid 92, mounted for rotation for covering the cartridge holder and movable relative to the main body portion 91 in the direction indicated by arrows g1 and g2. The cartridge holder holds the disc cartridge 5 inserted into and ejected from the cartridge holder in the direction indicated by arrow s f1 and f2 for holding the disc cartridge 5.

The main body portion 91 includes a loading mechanism, not shown, for supporting the cartridge holder for movement in a direction towards and away from the main body portion 91. The loading mechanism causes movement of the cartridge holder to the insertion/ejection position enabling the insertion/ejection of the disc cartridge 5 relative to the cartridge holder and a loading position of reproducing the information from the magneto-optical disc 6 of the disc cartridge 5. The loading mechanism also includes an ejection member, not shown, for ejecting the disc cartridge 5 held within the cartridge holder out of the cartridge holder by the cartridge holder being moved to the insertion/ejection position.

The lid 92 includes an operating portion, not shown, rotated in the direction indicated by arrow g1 for actuating the loading mechanism. As the lid 92 is rotated in the direction indicated by arrow g1, the cartridge holder is moved to a position facing to outside of the main body portion 91 via the loading mechanism, at the same time as the disc cartridge 5 held by the cartridge holder is ejected by the ejection member.

In the above-described disc player 2, as the intruding end of the disc cartridge 5, inserted into the main body portion 91 of the apparatus, as shown in FIG. 14 and 15, compresses against the lid 2, the lid is rotated in the direction indicated by arrow g1, as shown in FIGS. 14 and 15. As the lid 92 is rotated in the direction indicated by arrow g1, the cartridge holder is moved by the loading mechanism, the cartridge holder then facing to outside the main body portion 91 to permit the disc cartridge 5 to be intruded into and ejected from the cartridge holder, as shown in FIGS. 14 and 15.

In the present disc player 2, the cartridge holder is moved in a direction towards the main body portion 91, through the loading mechanism, by the lid 92 being moved in the direction indicated by arrow g2, thus causing the cartridge holder to be moved into the main body portion 91. In the disc player 2, the disc cartridge 5 held by the cartridge holder is loaded in position to reproduce the information from the disc cartridge 5 by the cartridge holder being moved into the inside of the main body portion 91.

Figure 16:
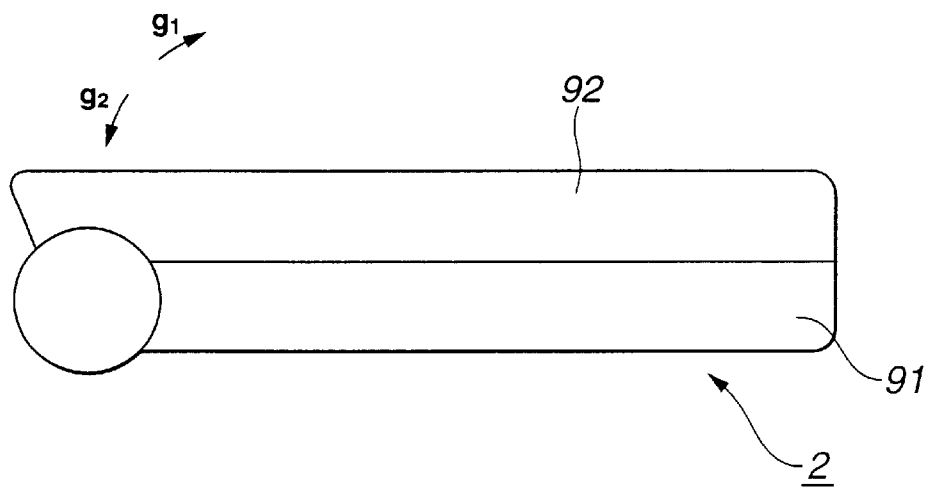
FIG. 16 is a side view showing the state in which the disc cartridge has been inserted into the disc player of FIG. 14.
Figure 17:
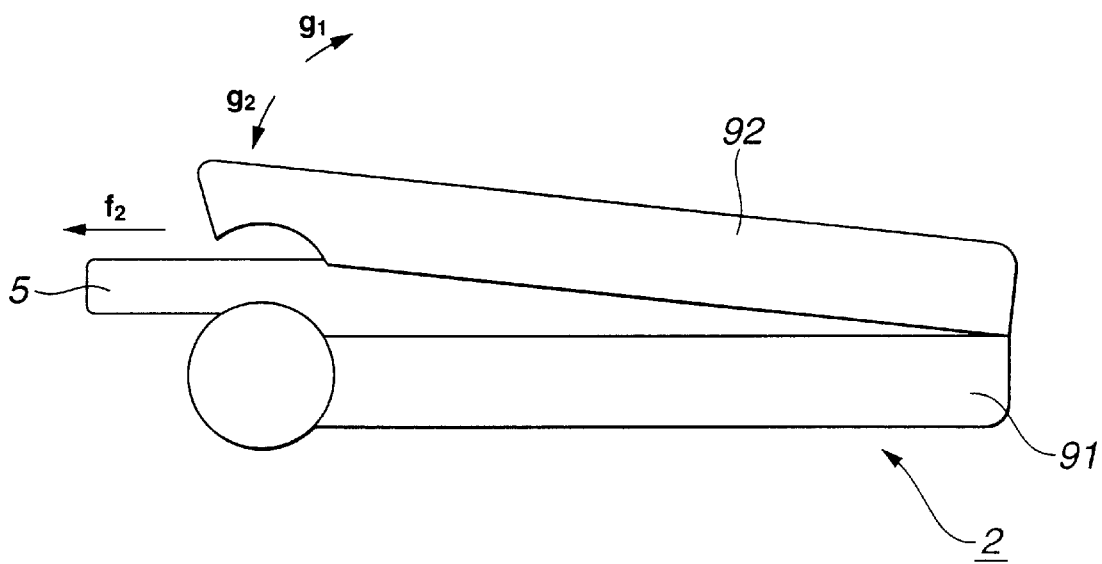
FIG. 17 is a side view showing the state of ejection of the disc cartridge from the disc player of FIG. 14.

When ejecting the disc cartridge 5 from the main body portion 91, the lid 92 is rotated in the direction indicated by arrow g1 relative to the main body portion 91, as shown in FIGS. 16 and 17. This causes the operating portion o the lid 92 to act on the loading mechanism to move the cartridge holder to the position of insertion/ejection, at the same time as the disc cartridge held by the cartridge holder is ejected by the ejection member.

With the above-described disc player 2, the disc cartridge 5 can be ejected extremely readily from the main body portion 91 by causing rotation of the lid 91 relative to the main body portion 91.

Although the disc players 1 and 2 are provided only with the reproducing mechanism, the information recording may also be made by having a magnetic head in a facing relation to the reproducing mechanism 16.

Although the disc players 1 and 2 are designed to reproduce the disc cartridge 5 having housed therein the magneto-optical disc 9, the disc players 1 and 2 may also be used with another type of the disc cartridge having housed therein another type of the optical disc, such as a CD (Compact Disc) or the DVD (Digit Versatile Disc).

What is claimed is:

1. An ejection mechanism housed in a main body of an apparatus comprising:
    an insertion/ejection opening through which a recording medium cartridge is inserted into or ejected from the main body portion;
    a lid provided for opening/closing said insertion/ejection opening; and
    means for ejecting said recording medium cartridge through said insertion/ejection opening, wherein
    said lid is provided with an operating portion operated relative to said insertion/ejection opening for opening said insertion/ejection opening and actuating said means for ejecting.

2. A recording and/or reproducing apparatus comprising:

a main body portion having an insertion/ejection opening for inserting/ejecting a recording medium cartridge;

a lid provided on said main body portion for opening/closing said insertion/ejection opening; and means for ejecting said recording medium cartridge through said insertion/ejection opening, wherein said lid is provided with an operating portion operated relative to said insertion/ejection opening for opening said insertion/ejection opening and for actuating said means for ejecting.

3. The recording and/or reproducing apparatus according to claim 2 further comprising:

loading means for moving said recording medium cartridge between an insertion/ejection position for inserting/ejecting said recording medium cartridge into or from said insertion/ejection opening and a loading position for recording and/or reproducing the information for said recording medium cartridge.

4. The recording and/or reproducing apparatus according to claim 2 wherein said lid is mounted for rotation relative to said insertion/ejection opening and includes loading means for moving said recording medium cartridge between a insertion/ejection position for effecting said insertion/ejection and a loading position for effecting recording and/or reproducing the information for said recording medium cartridge.

5. The recording and/or reproducing apparatus according to claim 4 wherein said ejection means includes a slider member moved by said operating portion of said lid for actuating said ejection means.

6. The recording and/or reproducing apparatus according to claim 4 wherein an abutment surface on which an intruding end of said recording medium cartridge compresses so that said lid is rotated in a lid-opening direction when said recording medium cartridge is inserted into said insertion/ejection opening, said abutment surface being formed in a surface of said lid facing to outside, and said abutment surface being formed at an angle of inclination relative to a direction perpendicular to a direction of insertion of said recording medium cartridge.

* * * * *